(12) United States Patent
Kamio

(10) Patent No.: US 8,253,292 B2
(45) Date of Patent: Aug. 28, 2012

(54) CRYOGENIC SUBMERGED TURBINE GENERATOR WITH HYDROSTATIC BEARINGS

(75) Inventor: Keijun Kamio, Sparks, NV (US)

(73) Assignee: Ebara International Corporation, Sparks, NV (US)

( * ) Notice: Subject to any disclaimer, the term of this patent is extended or adjusted under 35 U.S.C. 154(b) by 215 days.

(21) Appl. No.: 12/780,660

(22) Filed: May 14, 2010

(65) Prior Publication Data
US 2010/0289361 A1 Nov. 18, 2010

Related U.S. Application Data

(60) Provisional application No. 61/216,379, filed on May 15, 2009.

(51) Int. Cl.
*H02K 7/08* (2006.01)
*F16C 21/00* (2006.01)
*F04B 35/04* (2006.01)

(52) U.S. Cl. .............. 310/90; 417/423.12; 384/102
(58) Field of Classification Search .................. 310/90; 290/1 R, 43, 52, 54; 384/102
See application file for complete search history.

(56) References Cited

U.S. PATENT DOCUMENTS

| | | | | |
|---|---|---|---|---|
| 3,781,069 A * | 12/1973 | Gluchowicz | .................... | 384/12 |
| 4,362,020 A * | 12/1982 | Meacher et al. | ................. | 60/657 |
| 5,659,205 A | 8/1997 | Weisser | | |
| 6,441,508 B1 * | 8/2002 | Hylton | ............................ | 290/52 |
| 2006/0186671 A1 * | 8/2006 | Honda et al. | .................... | 290/54 |
| 2008/0122226 A1 * | 5/2008 | Madison | ......................... | 290/52 |
| 2009/0246048 A1 * | 10/2009 | Kawasaki et al. | .......... | 417/423.4 |

* cited by examiner

*Primary Examiner* — Burton Mullins
(74) *Attorney, Agent, or Firm* — Woodcock Washburn LLP

(57) ABSTRACT

A cryogenic submerged turbomachine equipped with one or more combinations of hydrostatic bearings, touchdown ball bearings, thrust bearings, and bushings. The pressurized fluid or gas introduced to the hydrostatic bearing creates a film of lubrication around at least one shaft of the turbomachine. A first combination includes at least a hydrostatic bearing or a pressurized journal bearing. A second combination includes a ball bearing and a thrust disk type bearing acting as a touchdown bearing. This second combination supports the rotor system of the turbine during transient periods when the Thrust Equalizing Mechanism device is not active, and decreases the axial thrust load during operation. A third combination uses a hydrostatic bearing with a sleeve that is joined as a unit with one or more ball bearings acting as touchdown ball bearings on the hydrostatic bearing sleeve.

13 Claims, 17 Drawing Sheets

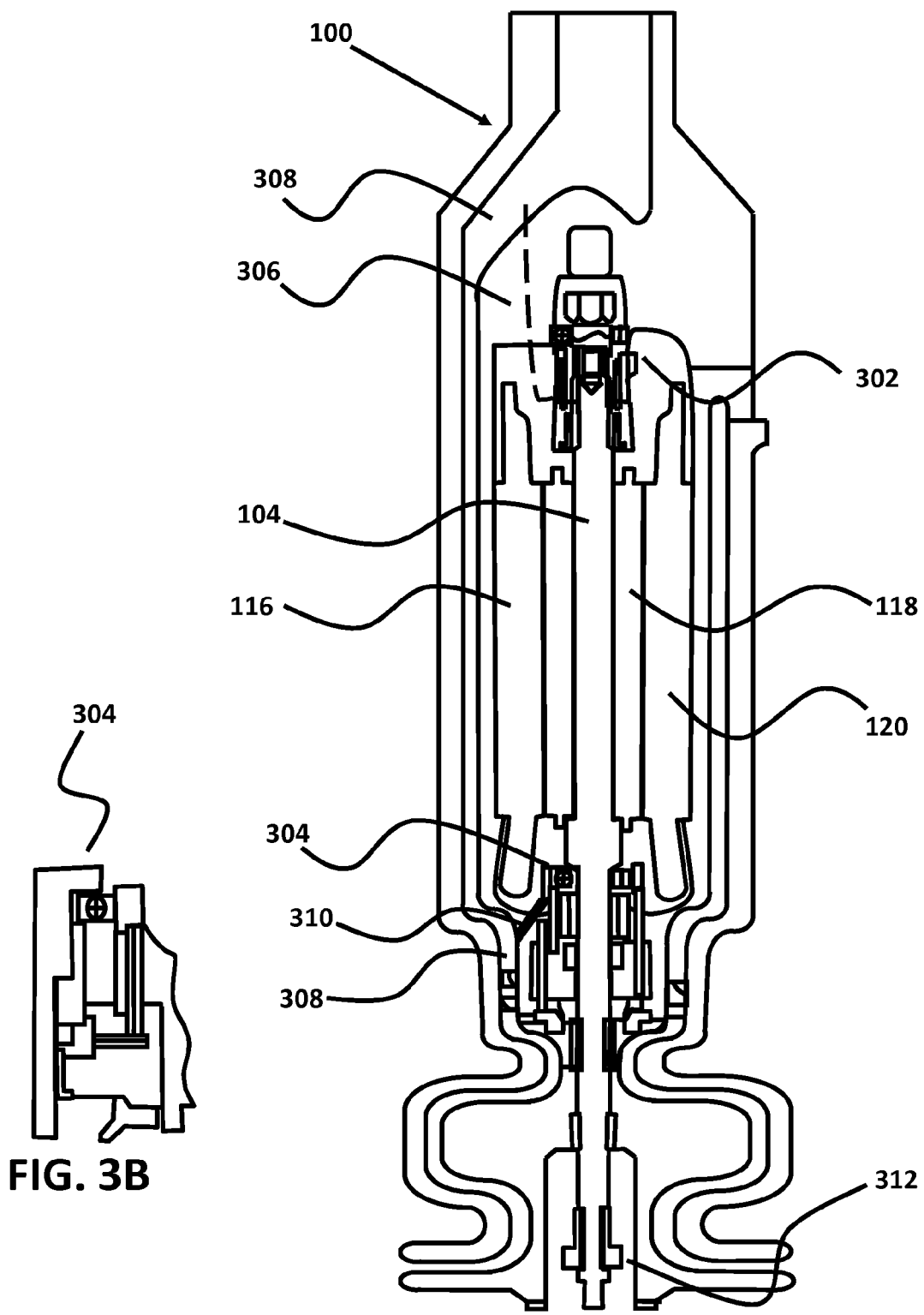

CRYOGENIC SUBMERGED TURBINE GENERATOR WITH HYDROSTATIC BEARINGS

CROSS-REFERENCES TO RELATED APPLICATIONS

This application claims priority from provisional patent application Ser. No. 61/216,379, filed May 15, 2009, which is hereby incorporated herein by reference in its entirety to be considered part of this specification.

BRIEF DESCRIPTION OF THE INVENTION

Turbomachinery equipped with one or more combinations of hydrostatic bearings with touchdown ball bearings and thrust bearings is disclosed. The bearings are equipped at an upper, lower, and tail portion of the one or more shafts of the turbine. Pressurized fluid or gas introduced to the hydrostatic bearings creates a film of lubrication around the one or more shafts of the turbine. An embodiment uses a combination of at least a hydrostatic bearing or a pressurized journal bearing. An alternative embodiment uses a combination of a ball bearing and a thrust disk type bearing acting as a touchdown bearing. This later combination supports the rotor system of the turbine during transient periods when the Thrust Equalizing Mechanism device is not active, and decreases the axial thrust load during operation. Yet another embodiment uses a combination of a hydrostatic bearing with a sleeve that is joined as a unit with one or more ball bearings acting as touchdown ball bearings on the hydrostatic bearing sleeve. Embodiments of the hydrostatic bearings include bushings. The various combinations of hydrostatic bearings can be used in expanders, pumps, or other devices.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

Cryogenic liquids are refrigerated liquefied gases with boiling points below −90° C. at atmospheric pressure. Different cryogens become liquids under different conditions of temperature and pressure. Industrial facilities that produce, store, transport and utilize such gases make use of a variety of turbine-based valves, pumps and expanders ("turbomachinery") to move, control and process the liquids and gases. The turbomachinery is often submerged in the cryogenic liquid being processed, which requires the equipment to be able to operate within difficult environmental conditions. U.S. Pat. No. 5,659,205 describes submerged turbomachinery that incorporate an axial thrust equalizing mechanism that utilizes a portion of the input fluid flow to balance the generated thrust forces as well as lubricating the ball bearing for the turbine shaft(s). U.S. Pat. No. 5,659,205 is hereby incorporated herein by reference in its entirety to be considered part of this specification

BRIEF DESCRIPTION OF THE SEVERAL VIEWS OF THE DRAWING

FIGS. 3A, 3B, 3C and 3D illustrate cross-sectional views of an expander using a combination of a hydrostatic bearing with a touchdown ball bearing in accordance with an embodiment;

DETAILED DESCRIPTION OF THE INVENTION

Figure 1:
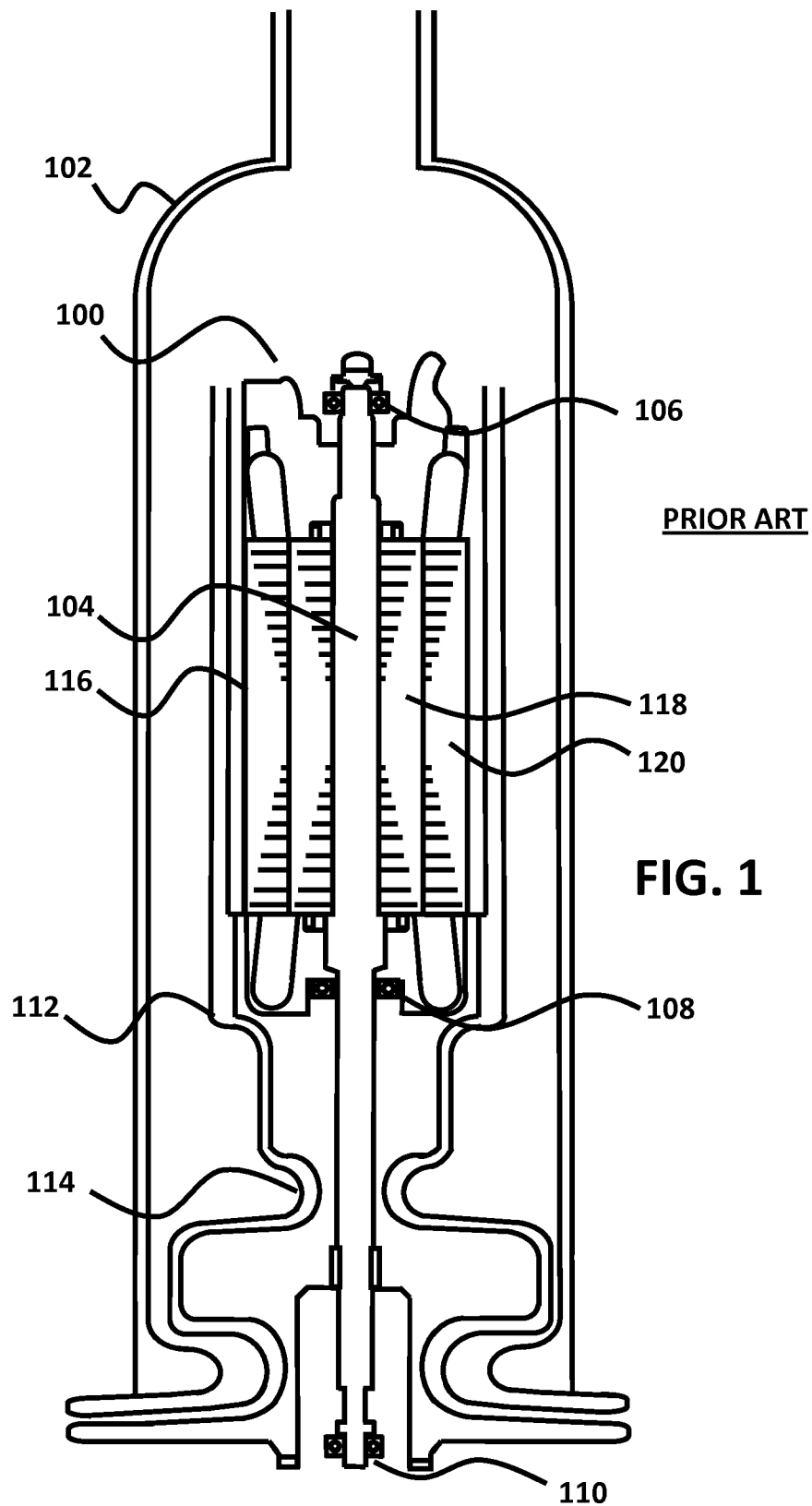
FIG. 1 is a cross-sectional view of an expander with ball bearings according to the prior art.

U.S. Pat. No. 5,659,205 is hereby incorporated herein by reference in its entirety to be considered part of this specification. The present invention improves on the combination of bearing mechanisms that are used to support and balance the one or more shafts of submerged turbomachinery, such as those described and disclosed in U.S. Pat. No. 5,659,205.

Embodiments are directed to turbomachinery, including turbines and compressors, equipped with one or more combinations of hydrostatic bearings with touchdown ball bearings and thrust bearings. The bearings are equipped at an upper, lower, and tail portion of the one or more shafts of the turbine. The pressurized fluid or gas introduced to the hydrostatic bearing creates a film of lubrication around the one or more shafts. An embodiment uses a combination of at least a hydrostatic bearing or a pressurized journal bearing. An alternative embodiment uses a combination of a ball bearing and a thrust disk type bearing acting as a touchdown bearing. This later combination supports the rotor system of the turbine during transient periods when the Thrust Equalizing Mechanism (TEM) device is not active, and decreases the axial thrust load during operation. Yet another embodiment uses a combination of a hydrostatic bearing with a sleeve that is joined as a unit with one or more ball bearings acting as touchdown ball bearings on the hydrostatic bearing sleeve. Embodiments of the hydrostatic bearings include bushings. The various combinations of hydrostatic bearings can be used in expanders, pumps, or other turbomachine devices with one or more shafts.

Embodiments herein will be described with reference to an expander comprised of a single rotor shaft with bearings installed in three portions along the rotor shaft: an upper bearing, a lower bearing, and a tail bearing. Alternative embodiments with only two bearings, or with more than one shaft, are within the scope and spirit of the invention. In addition, embodiments are not limited to use in expanders. Embodiments may also be used in pumps or other turbomachine devices including turbines and compressors.

A first embodiment uses a stationary touchdown ball bearing concept. The upper bearing uses the combination of a hydrostatic bearing with a touchdown ball bearing. The lower bearing uses the combination of a hydrostatic bearing with a touchdown ball bearing. Finally, the tail bearing uses a hydrostatic bearing or a journal bearing. Alternative embodiments may use the combination of a hydrostatic bearing with a touchdown ball bearing in either the upper or the lower bearings instead of in both the upper and the lower bearings.

A second embodiment uses a similar stationary touchdown ball bearing concept. The upper bearing uses the combination of a hydrostatic bearing with a touchdown ball bearing. However, the lower bearing uses the combination of a hydrostatic bearing, a touchdown ball bearing, and a thrust bearing installed adjoining to the hydrostatic bearing sleeve. The tail bearing can use either a hydrostatic bearing or a journal bearing.

A third embodiment uses a rotational touchdown ball bearing concept. The upper bearing uses the combination of a hydrostatic bearing with a touchdown ball bearing installed underneath of the hydrostatic bearing sleeve. The lower bearing can use a combination similar to the upper bearing, or a combination from any of the other mentioned embodiments discussed herein. Alternatively, the lower bearing may use the combination of the hydrostatic bearing with a touchdown ball bearing installed underneath of the hydrostatic bearing sleeve, with the upper bearing using a combination from any of the other embodiments discussed herein. The tail bearing can use either a hydrostatic bearing or a journal bearing.

A fourth embodiment uses a similar rotational touchdown ball bearing concept. The upper bearing uses the combination of a hydrostatic bearing and a touchdown ball bearing installed underneath of the hydrostatic bearing sleeve. The lower bearing can use the combination of a hydrostatic bearing, a touchdown ball bearing installed underneath of the hydrostatic bearing sleeve, and a thrust bearing is installed adjoining to the hydrostatic bearing sleeve. The tail bearing can use a hydrostatic bearing or a journal bearing.

A fifth embodiment uses a thrust bearing concept. The upper bearing uses a hydrostatic bearing. However, the upper bearing may further include a touchdown ball bearing. The lower bearing can use a hydrostatic bearing with a thrust bearing. The tail bearing can use either a hydrostatic bearing or a journal bearing.

FIG. 1 illustrates an expander 100 submerged inside a cryogenic vessel 102 using ball bearings according to prior art. The expander 100 is a radial inflow reaction turbine with an induction generator or electric motor mounted on a motor shaft. The embodiment illustrated in FIG. 1 consists of an expander whose components are all fully submerged in the product being expanded and where the ball bearings are product lubricated. Alternative embodiments may consist of the turbine being separated from the electric motor via a magnetic coupling membrane.

The expander 100 includes a shaft 104 mounted on three ball bearings: an upper bearing 106, a lower bearing 108, and a tail bearing 110. The product flowing through the expander 100 flows through the main circuit 112 of the expander. The main circuit further consists of a series of runner stages 114. The product flowing through the runner stages 114 causes the shaft 104 to turn. The turning of the shaft 104 runs the electric motor 116. The electric motor 116 is an induction generator including an electric motor rotor 118 and an electric motor stator 120. The exact nature and operation of the expander may be different that described herein, but use a similar bearing structure to that shown in FIG. 1.

Figure 2A:
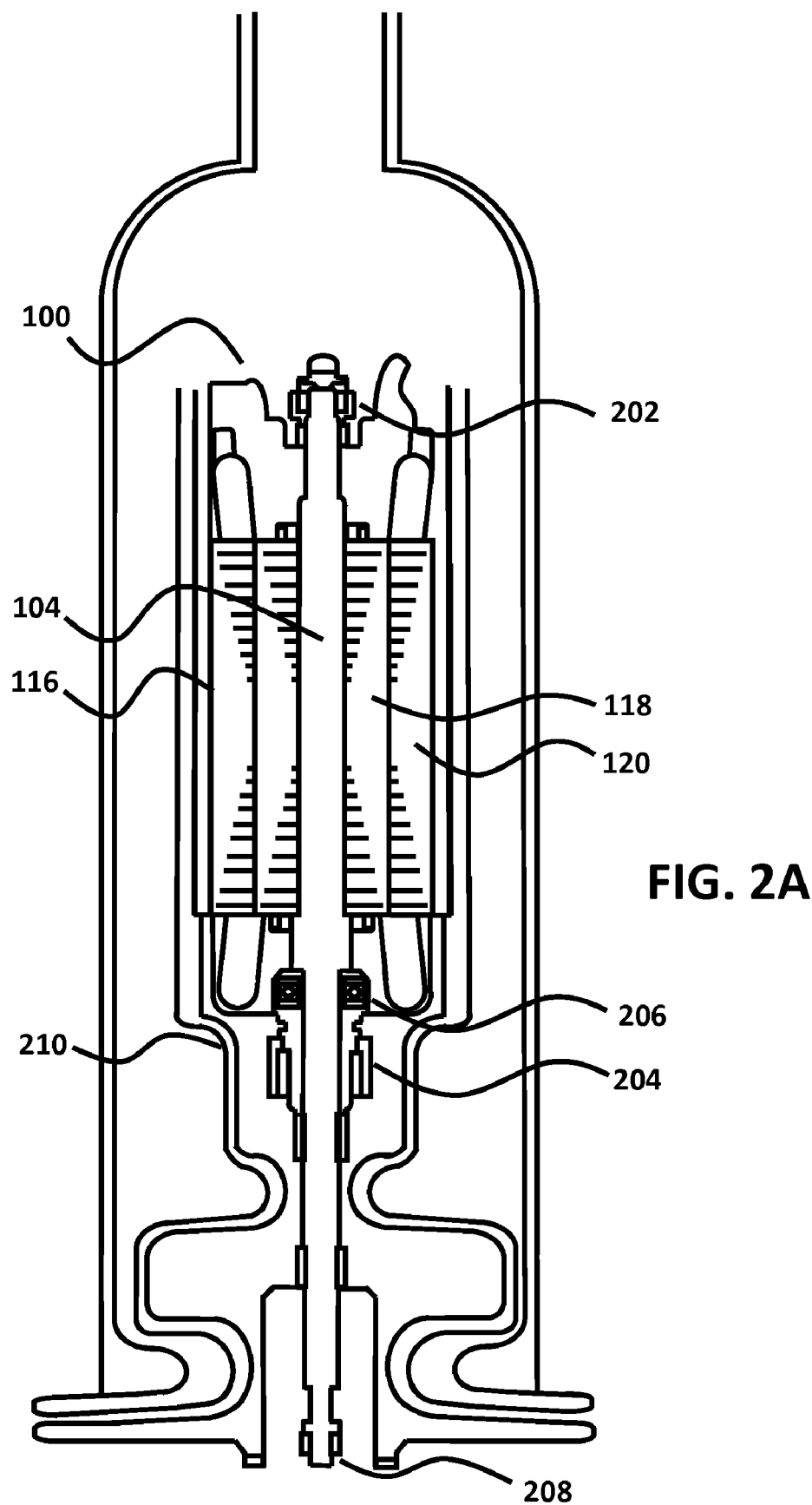
FIG. 2A is a cross-sectional view of an expander using a combination of a hydrostatic bearing with a touchdown ball bearing in accordance with an embodiment.

FIG. 2A illustrates an embodiment that combines a hydrostatic bearing with a touchdown ball bearing. The upper bearing 202 consists of a hydrostatic bearing. The lower bearing consists of a hydrostatic bearing 204 combined with a touchdown ball bearing and a disk type thrust bearing 206. The tail bearing 208 consists of a hydrostatic bearing. The fluid used to feed the pressurized fluid or gas to the hydrostatic bearings used in the upper, lower, and tail bearings is taken from the main circuit 210 of the expander 100.

Figures 2B, 2C:
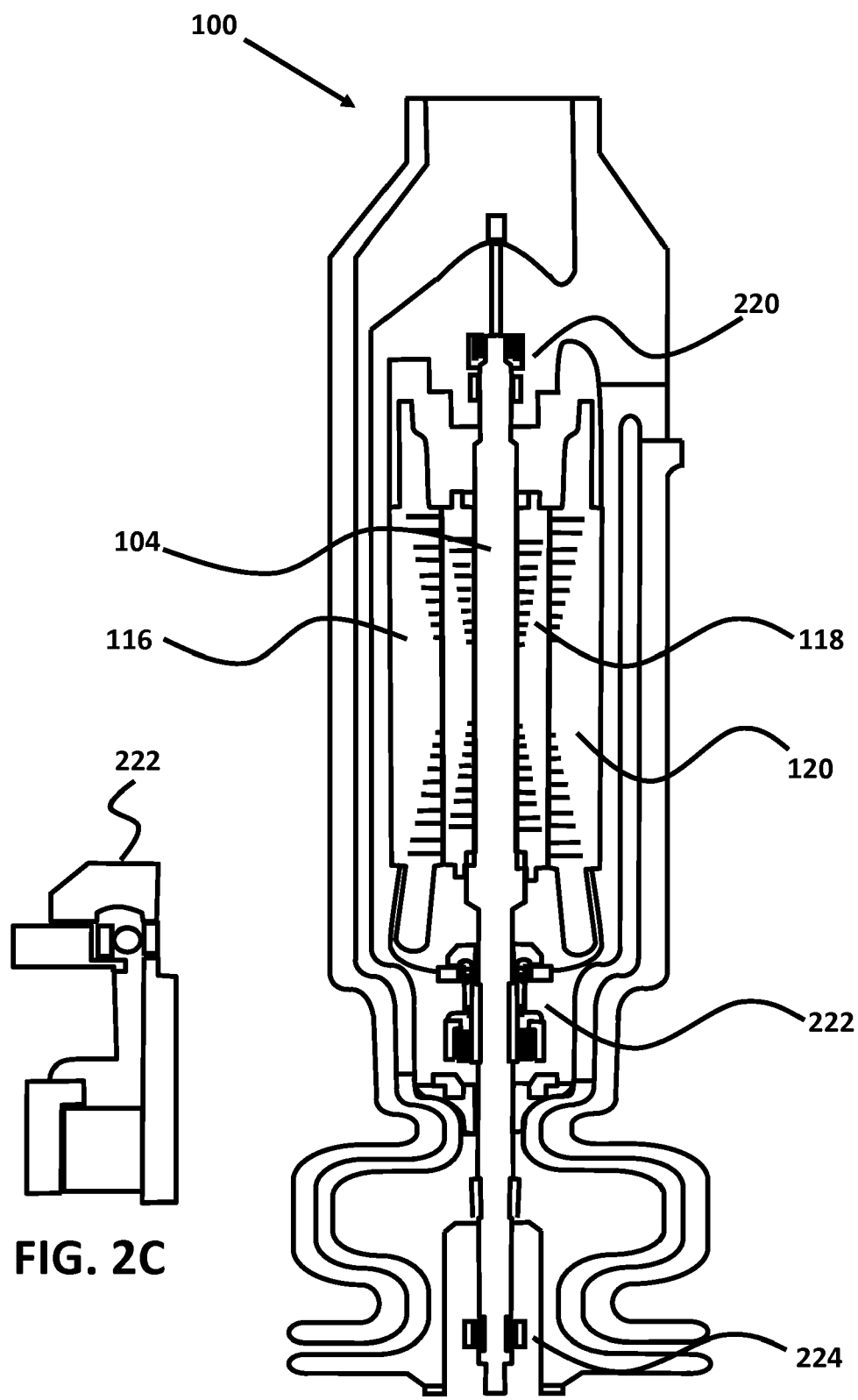
FIGS. 2B and 2C illustrate cross-sectional views of an expander using a combination of a hydrostatic bearing with a disk type thrust bearing in accordance with an embodiment.

FIG. 2B illustrates an embodiment that combines a hydrostatic bearing with a disk type thrust bearing, but without the touchdown ball bearing used in FIG. 2A. The upper bearing 220 uses a hydrostatic bearing. The lower bearing 222 uses a hydrostatic bearing with a disk type thrust bearing. The lower bearing 222 is further illustrated in the break out illustration of FIG. 2C. The tail bearing 224 uses a hydrostatic bearing.

FIG. 3A illustrates an embodiment using a stationary type touchdown ball bearing concept. A hydrostatic bearing and a touchdown bearing are used for both the upper bearing 302 and the lower bearing 304. Alternative embodiments may use a hydrostatic bearing and a touchdown bearing for either the upper bearing or the lower bearing, instead of using this combination for both the upper bearing and the lower bearing. The hydrostatic bearing functions by introducing pressure extracted from the flow circuit or runners of the expander. The lower bearing 304 is further illustrated in FIG. 3B. An upper feed line, identified by the dashed line 306, for the upper bearing 302 extracts fluid or gas from the main circuit 308 and feeds the hydrostatic bearing. The feed line may include a leakage line allowing for the pressure extracted to be adjusted if necessary. Similarly, a lower feed line 310 extracts fluid from the main circuit 308 and supplies pressurized fluid or gas to the hydrostatic bearing of the lower bearing 304. The tail bearing 312 consists of a hydrostatic bearing.

Figure 3C:
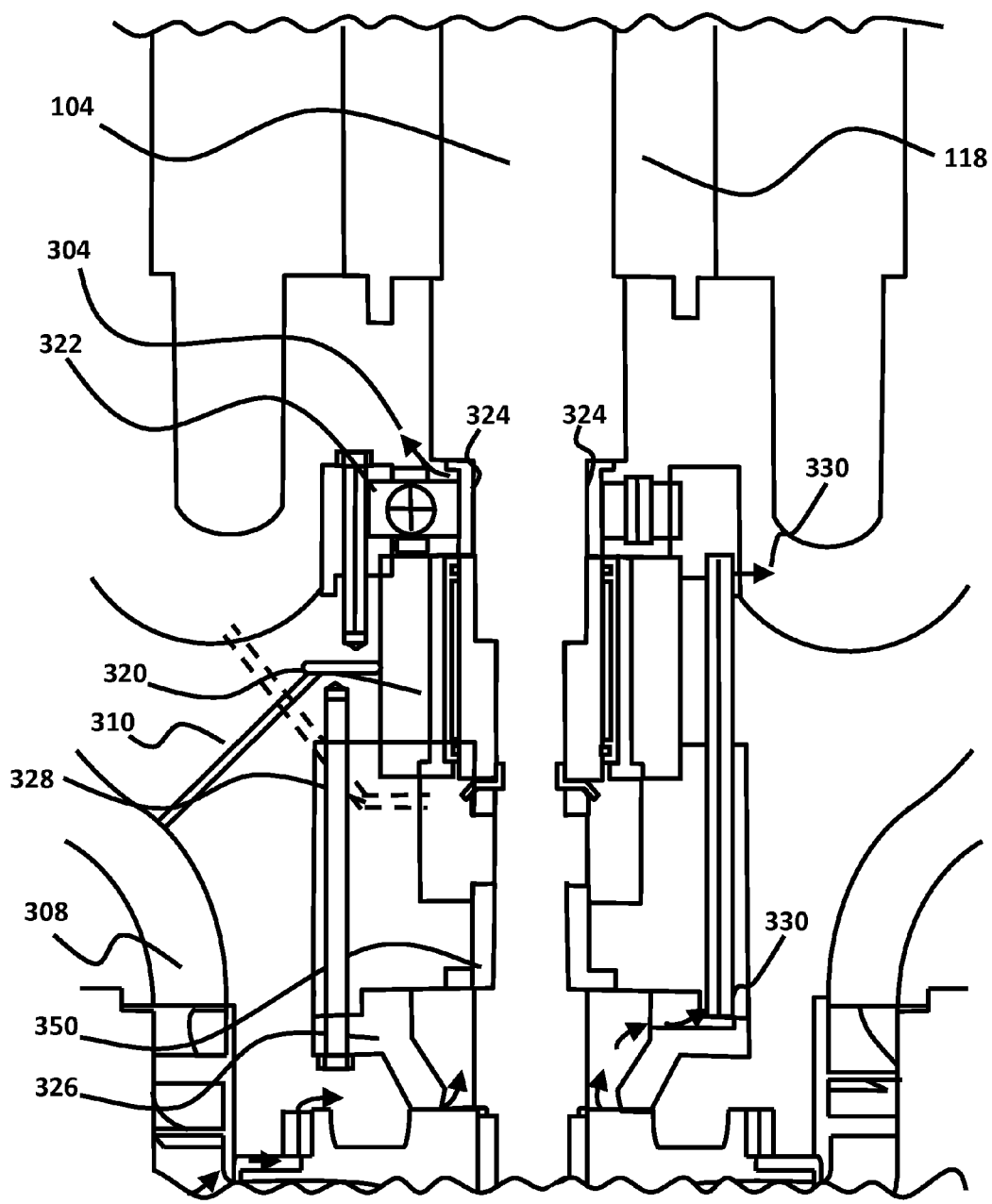

FIG. 3C further illustrates the lower bearing 304 in greater detail. The lower bearing 304 includes a hydrostatic bearing 320 and a touchdown ball bearing 322. The bearing arrangement includes a clearance 324 between the inner diameter of the touchdown ball bearing 322 and the outer diameter of the shaft 104. The touchdown ball bearing 322 supports the shaft 104 axially during standstill conditions and when the shaft 104 is operating at low rotation speeds (rotation speed of the turbine shaft is less than a rotation threshold). If the expander includes a Thrust Equalizing Mechanism (TEM) device 326, the TEM device 326 may not be active during low rotation speeds. Alternative embodiments may not include a TEM device 326.

When in use, the TEM device 326 balances hydraulic thrust and ensures that the bearings are not subjected to axial loads within the normal operating range of the expander. The TEM device 326 can also be used to provide fluid to the bearings. When fluid or gas being expanded is used for lubrication of the bearings, it is imperative that the axial thrust loads are balanced to prevent vaporization of the fluid in the bearings so as to ensure reliability. Axial force along the expander is produced by unbalanced pressure, dead-weight, and liquid directional change. Self adjustment by the TEM device 326 allows the product-lubricated ball bearings to operate at near-zero thrust load over the entire usable capacity range for expanding. This consequently increases the reliability of the bearings, and reduces equipment maintenance requirements.

The shaft 104 starts rotating when flow is introduced into the expander 100. As the rotation of the shaft 104 increases, the TEM device 326 becomes operational (when the rotation speed of the turbine shaft is greater than a rotation threshold). Once the expander reaches a certain revolution, the TEM device 326 begins to lift the shaft 104 by pushing up the rotor 118 using an axial thrust force, while holding the shaft 104 at an axially balanced position. The rotation of the shaft 104 makes the rotor 118 spin, which consequently supports the shaft 104 freely due to the rotational speed.

When the shaft 104 is lifted, the touchdown ball bearing 322 is disengaged with the shaft 104, which frees the touchdown ball bearing 322 from supporting the shaft 104 axial and radial loads. The hydrostatic bearing 320 engages when the touchdown ball bearing 322 disengages and supports the radial load of the shaft 104. The hydrostatic bearing 320 handles the radial load by introducing fluid or gas pressure taken from the main flow circuit 308 of the expander through the lower feed line 310. The introduced fluid or gas pressure creates a thin lubrication layer of fluid or gas that supports the shaft 104 radially while the TEM device 326 supports the shaft 104 axially.

During start/stop periods of the expander, the shaft 104 gradually descends as pressure in the expander is decreased. At a certain speed and pressure level, the sleeve of the touchdown ball bearing 322 makes contact with the shaft 104, at either a flat face or a tapered face, and engages the weight of the shaft 104. This allows for the touchdown ball bearing 322 to support the hydrostatic bearing 320 as the speed and pressure of the expander decreases, further allowing for smooth rotations of the expander shaft 104.

Figure 3D:
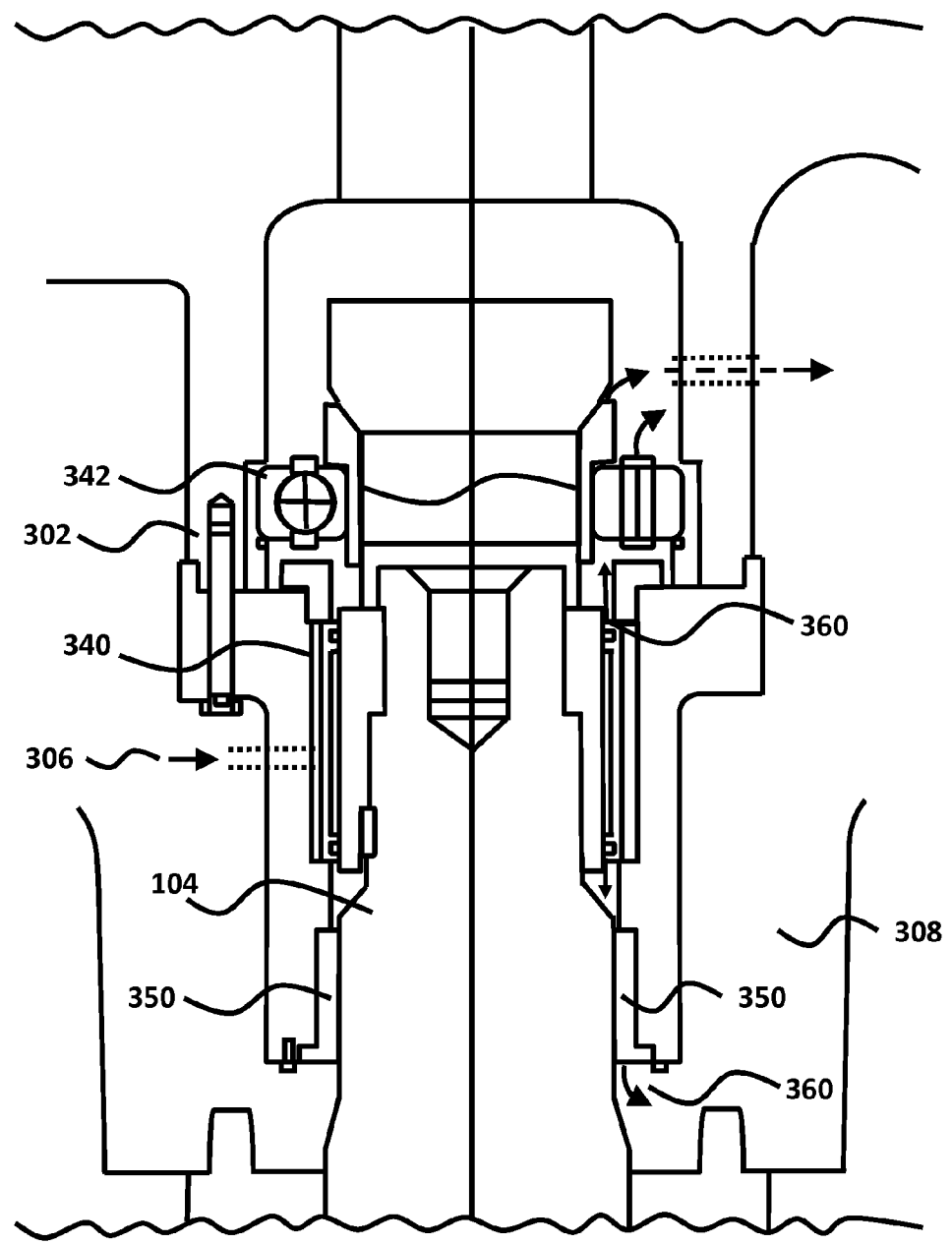

FIG. 3D illustrates the upper bearing 302 in detail. The upper bearing consists of a hydrostatic bearing 340 and a touchdown ball bearing 342, which operate in substantially the same manner as the hydrostatic bearing 320 and touchdown ball bearing 322 described above. Embodiments of the upper bearing 302 and the lower bearing 304 may include a bushing 350 that provides radial support. An L-shaped bushing 350 is illustrated in FIG. 3D, but different types of bushings could also be used. FIG. 3D also further illustrates the operation of the feed lines 306 and 310 and the manner in which fluid is directed to, through and away from the bearings and bushing. As shown in FIG. 3D, fluid enters the hydrostatic bearing 340 through the upper feed line, shown by the arrow 306 on the left side of FIG. 3D, and the fluid travels in the direction of the arrows 360 shown on the right side of FIG. 3D, such that fluid travels between the shaft 104 and the bushing 350, between the shaft 104 and the top and bottom of the hydrostatic bearing 340, between the shaft 104 and the touchdown ball bearing 342, through the touchdown ball bearing 342, and back out to the main circuit 308.

The hydrostatic bearing 320/340, and the hydrostatic bearing of other embodiments, includes several pockets formed therein arranged at intervals around the circumference of the hydrostatic bearing 320/340. Each pocket serves the function of a jet exhaust nozzle. The inlet pressure to the hydrostatic bearing is extracted from the main circuit 308 of the expander. The proper supply of pressure is controlled by the jet exhaust nozzles formed by the pockets. The layer of fluid or gas pressure in the hydrostatic bearing supports the shaft 104 and the rotor 118 hydraulically, further allowing for the pressurized liquid or gas leak from the hydrostatic bearing 320/340 axially, for example, through the clearance 324 between the hydrostatic bearing 320 and the shaft 104.

For the upper portion of the shaft 104, the pressurized liquid or gas is leaked upwards and downwards along the shaft 104. The downwards leakage enters into the upper side chamber of the expander through the bushing 350. The upwards leakage passes through the clearance between the touchdown bearing 322 and the shaft 104. The lower bearing 304 can be arranged similarly to the upper bearing 302. The hydrostatic bearing leakage 328 from the hydrostatic bearing 320 is introduced into the lower side chamber of the expander and merged with the TEM leakage 330 from the TEM device 326.

Figure 4A:
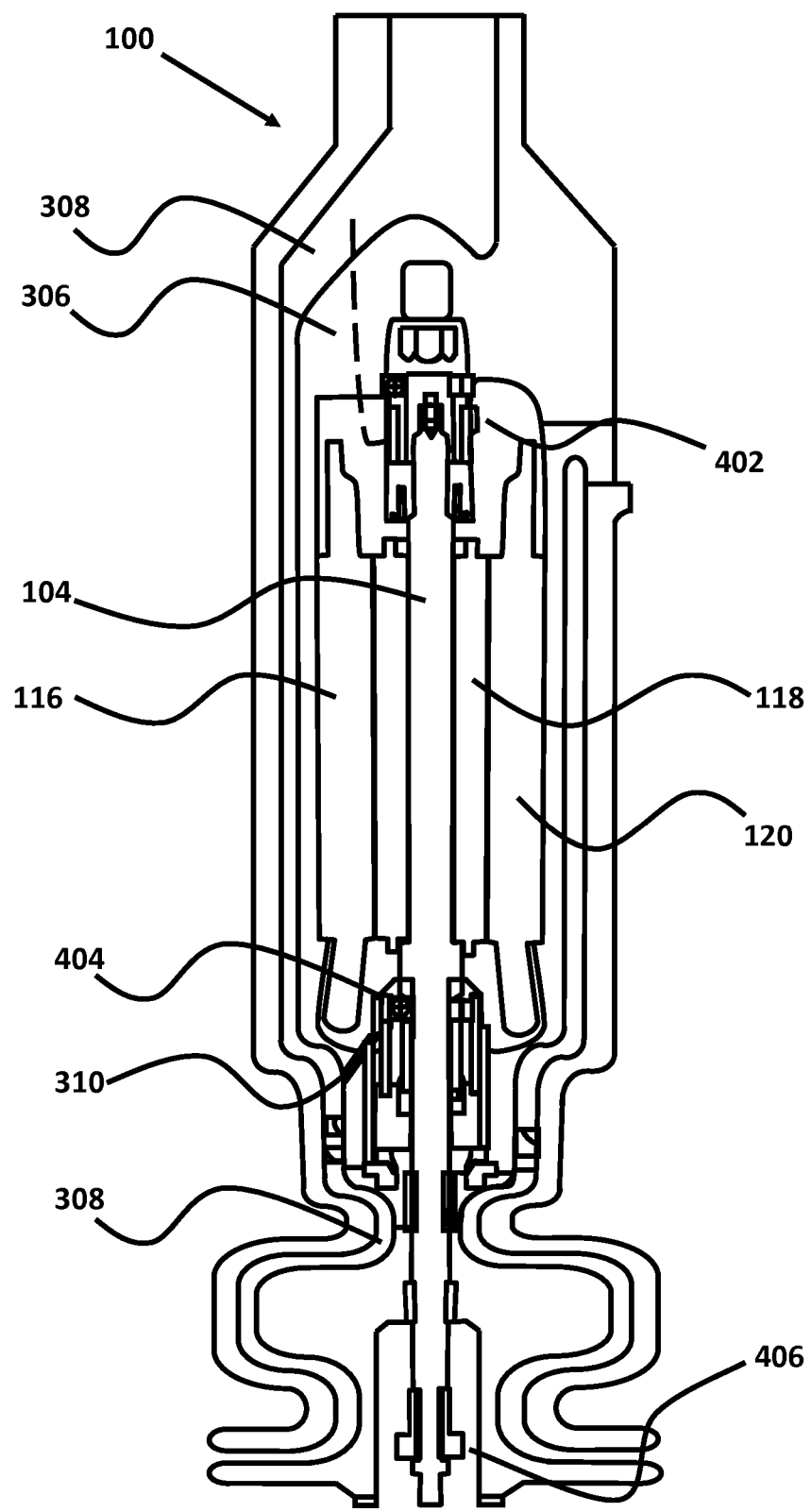
FIGS. 4A and 4B illustrate a cross-sectional views of an expander using a combination of a hydrostatic bearing, a touchdown ball bearing, and a thrust bearing in accordance with an embodiment.
Figure 4B:
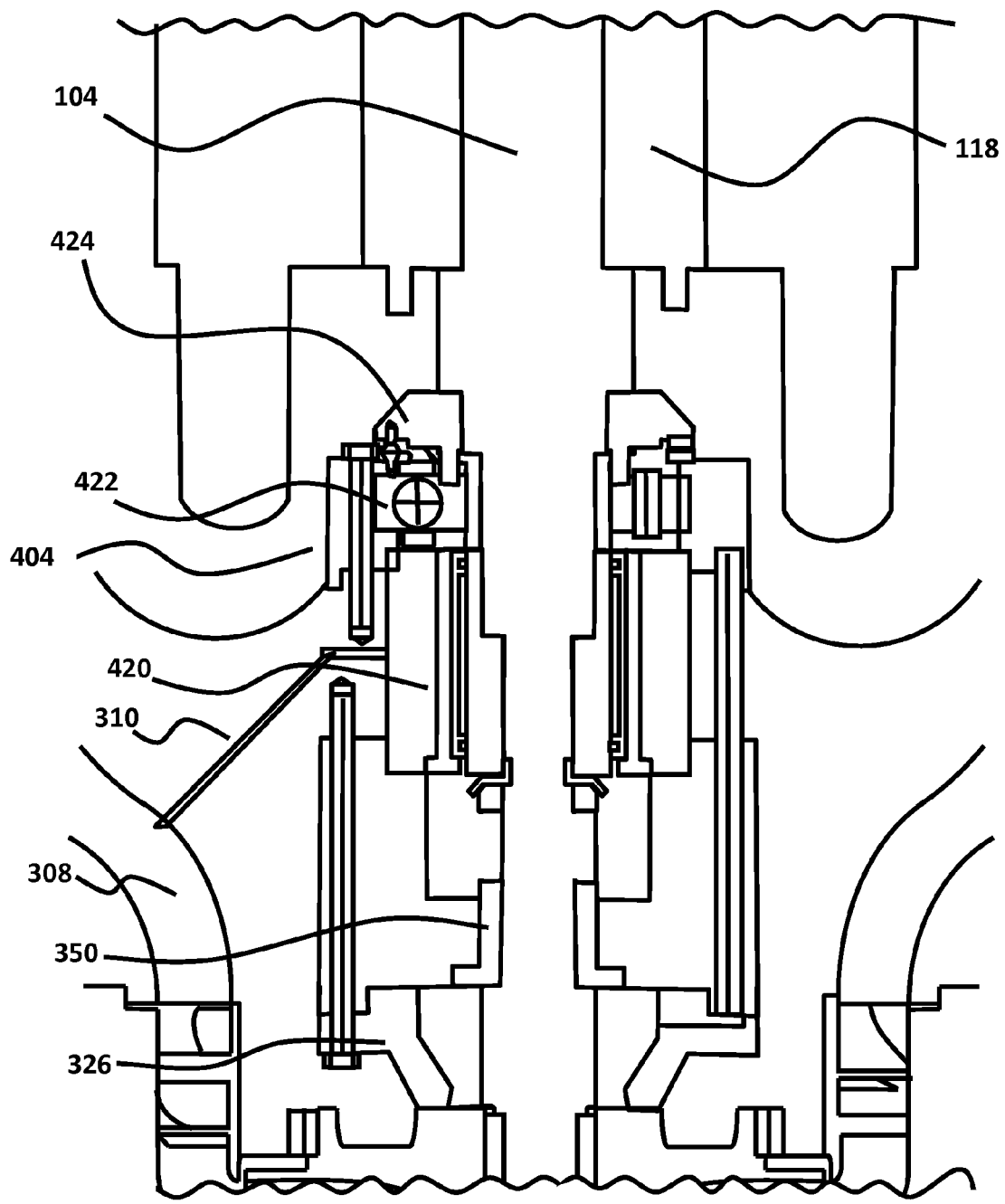

FIG. 4A illustrates an alternative embodiment that uses the combination of a hydrostatic bearing, a touchdown ball bearing, and a thrust bearing for either the upper bearing 402, or the lower bearing 404, or both the upper bearing 402 and the lower bearing 404. The tail bearing 406 is a hydrostatic bearing. FIG. 4B illustrates in detail the lower bearing 404. The lower bearing arrangement includes the hydrostatic bearing 420, the touchdown ball bearing 422, which operate in the same manner as described above with respect to the same types of bearings described, and the thrust bearing 424. The thrust bearing 424 protects the rotor 118 from damage when the other bearings are damaged (the touchdown ball bearing 422 or the sleeve of the hydrostatic bearing 420) and the shaft 104 is dropped. Examples of thrust bearings include a flat disk type bearing, a thrust pad type bearing, a hydrostatic thrust bearing, or a combination of these. The type of thrust bearing to use may depend on several conditions, such as the rotor weight, the rotor speed, etc.

Figure 5A:
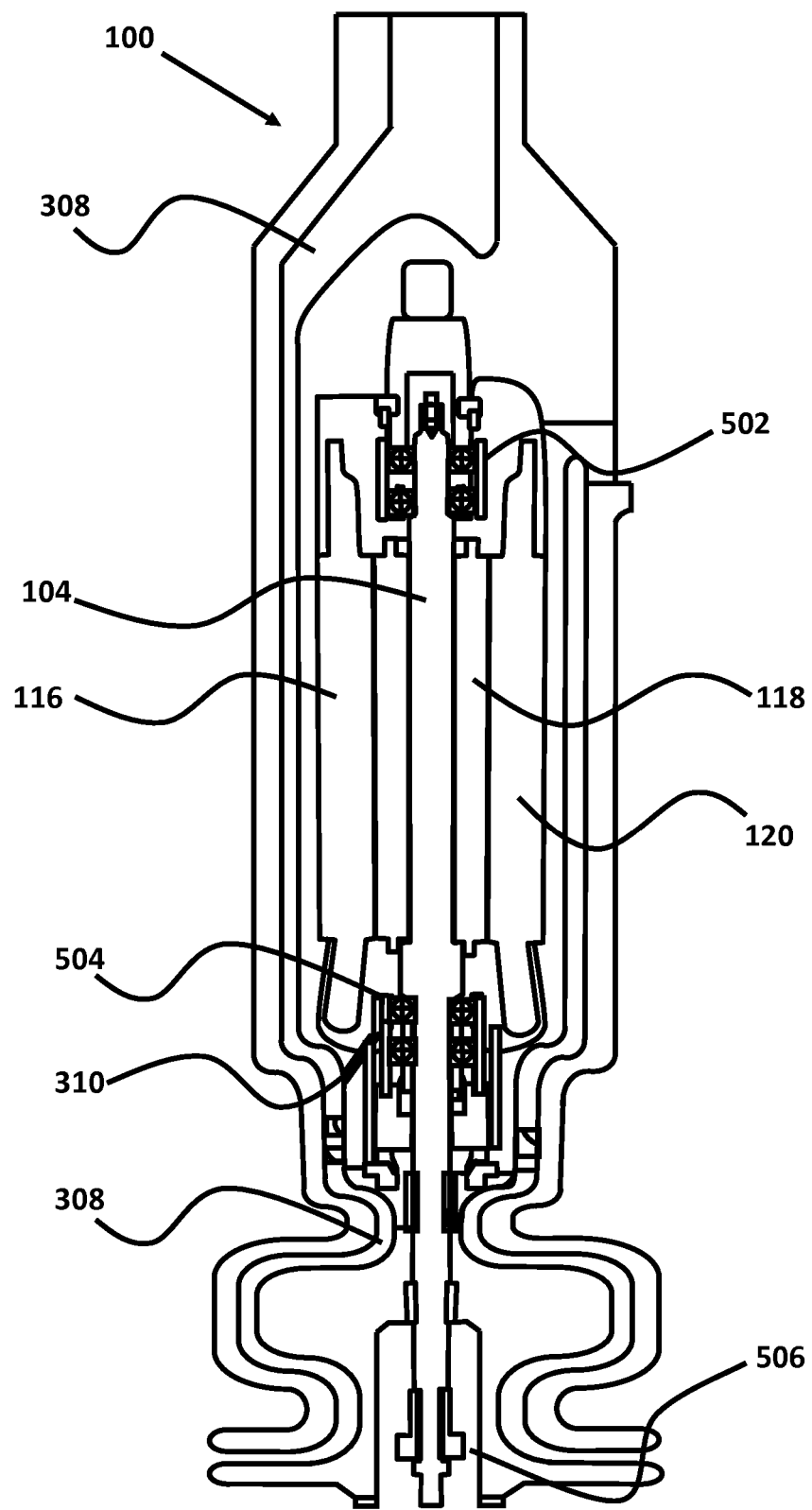
FIGS. 5A, 5B and 5C illustrate cross-sectional views of an expander using a combination of a hydrostatic bearing and at least one touchdown ball bearing, where the sleeve for the hydrostatic bearing and the at least one touchdown ball bearing are joined as one piece and fixed to the shaft of the expander.
Figure 5B:
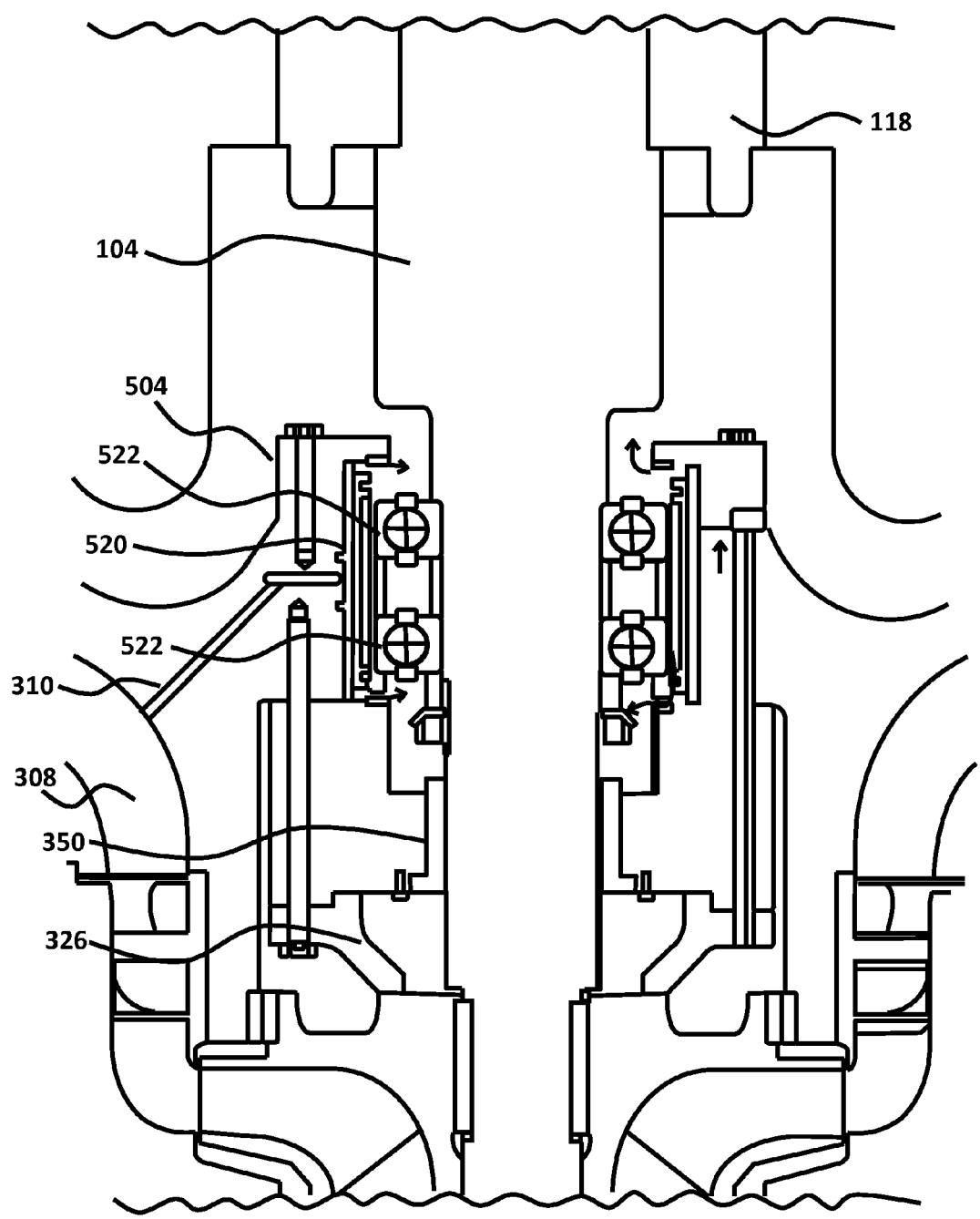
Figure 5C:
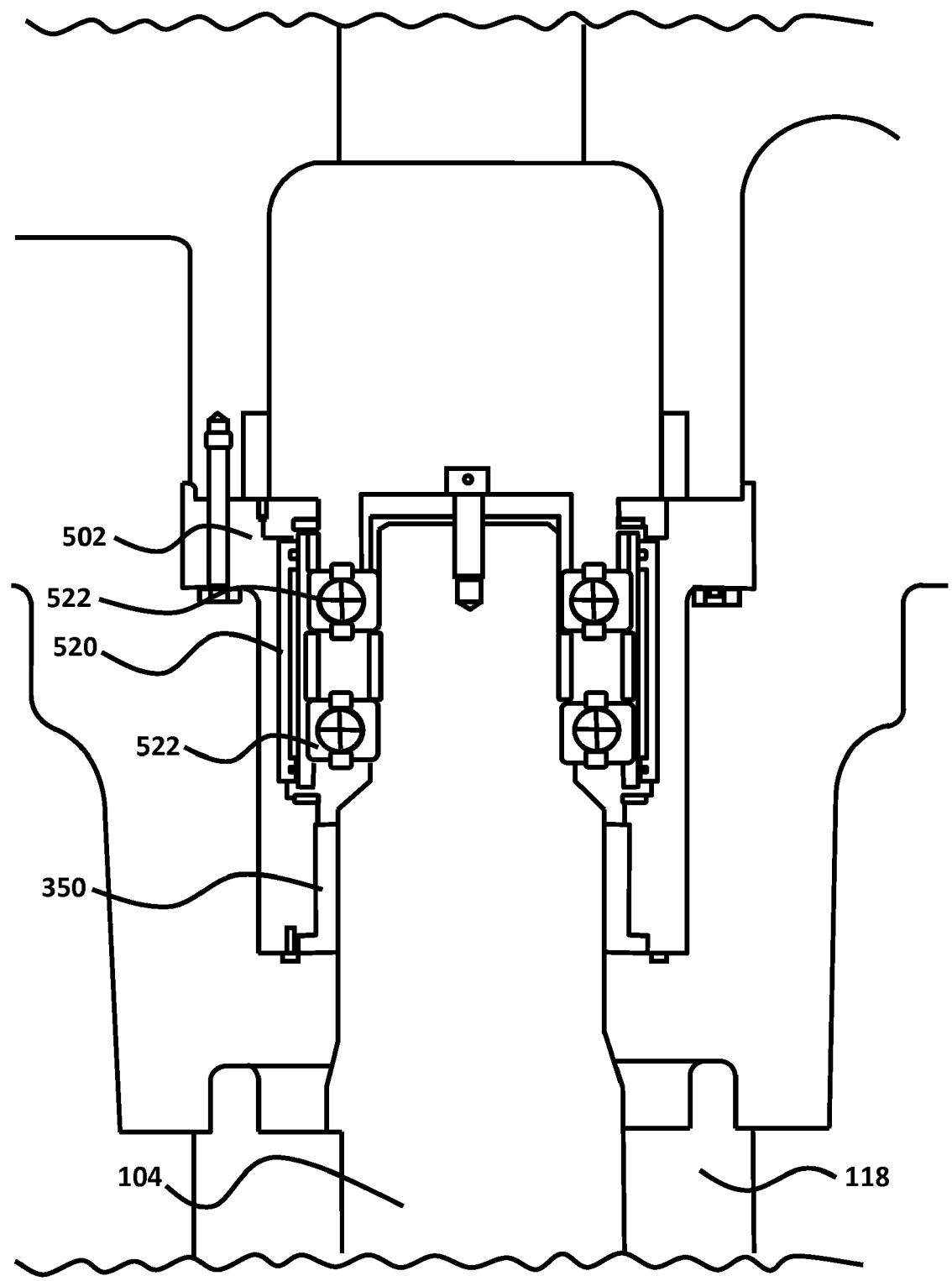

An alternative rotational touchdown ball bearing concept uses the combination of a hydrostatic bearing and at least one touchdown ball bearing, where the shaft sleeve for the hydrostatic bearing and the touchdown ball bearing are joined as one piece and fixed to the shaft of the expander. FIG. 5A illustrates an embodiment where two touchdown ball bearings are joined with the sleeve of the hydrostatic bearing for both the upper bearing 502, illustrated in detail in FIG. 5C, and the lower bearing 504, illustrated in detail in FIG. 5B. The tail bearing 506 is a hydrostatic bearing. As shown in FIGS. 5B and 5C, the lower bearing 504 and the upper bearing 502, respectively, each include hydrostatic bearing 520 and two touchdown ball bearings 522 joined together (and bushings as described above). This combination, when used for either of the upper bearing 502 or the lower bearing 504, or for both the upper bearing 502 and the lower bearing 504, allows for the rotor 118 weight and the axial thrust load to be supported during standstill conditions, and during transient conditions at start/stop periods until the shaft 104 is lifted by the TEM device 326. Once the TEM device 326 is functioning and the shoulder of the hydrostatic bearing 520 sleeve is disengaged, the touchdown ball bearings 522 radially support the hydrostatic bearing 520 sleeve. The rotor 118 is supported radially by the hydrostatic bearing 520 via the sleeve unit which rotates along with the rotor 118 and the shaft 104.

Figure 6A:
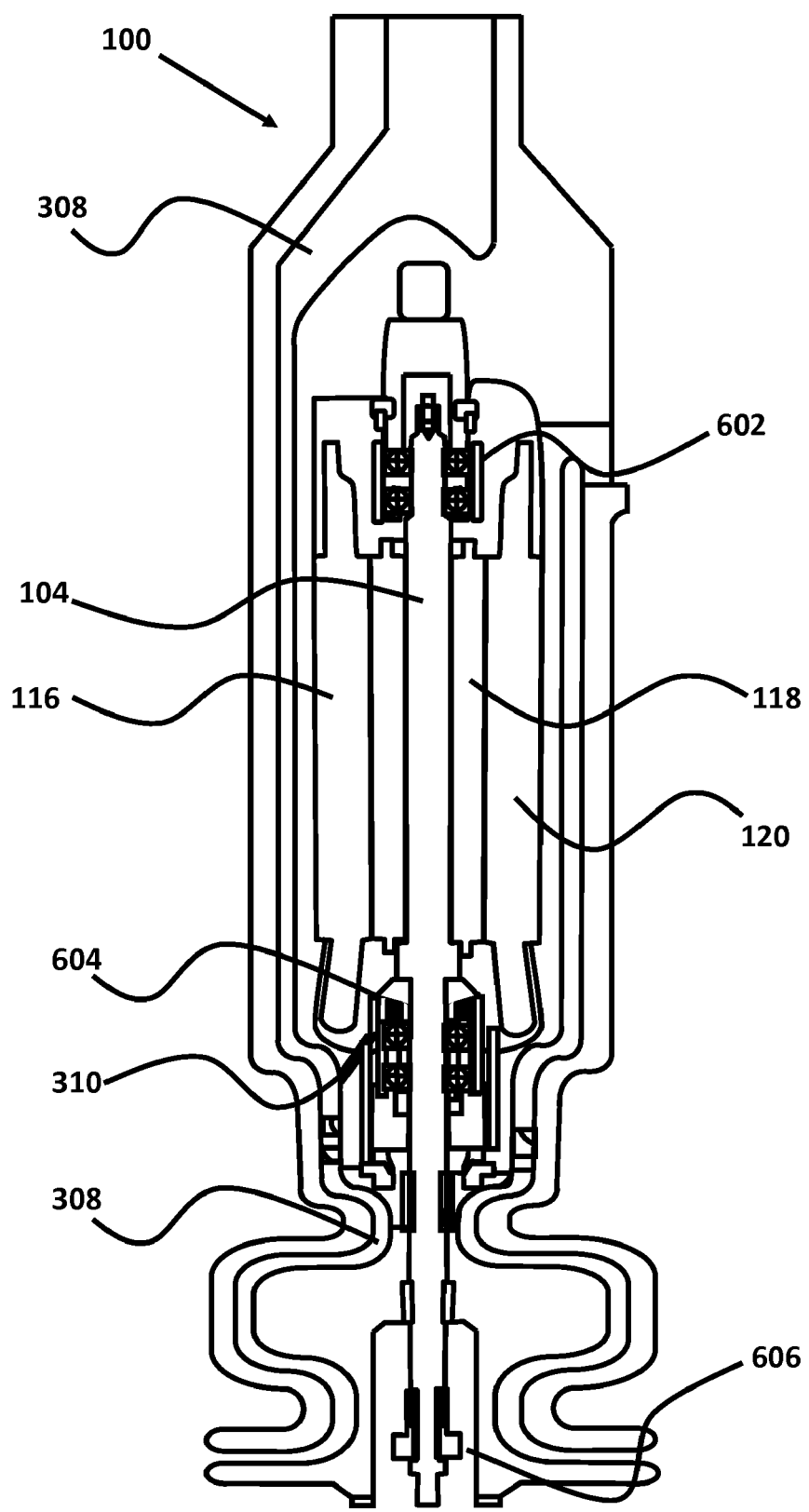
FIGS. 6A and 6B illustrate cross-sectional views of an expander using a combination of a hydrostatic bearing sleeve joined with at least one touchdown ball bearing, and a thrust bearing in accordance with an embodiment.
Figure 6B:
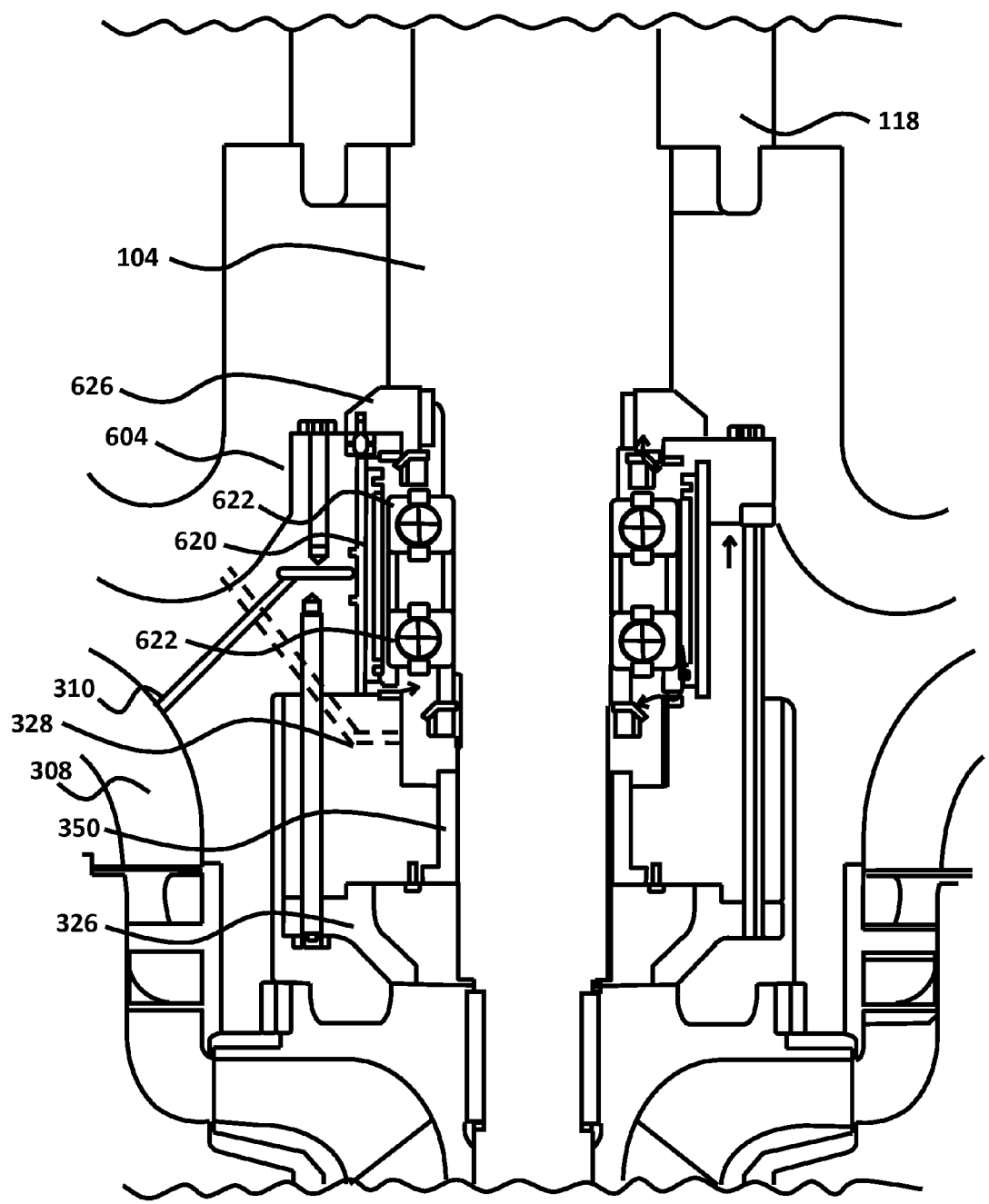

An alternative embodiment uses the combination of the joined hydrostatic bearing sleeve with at least one touchdown ball bearing, but in addition uses a thrust bearing to the rotor in case that hydrostatic bearing or the touchdown ball bearings are damaged. The thrust bearing restricts leakage flow from the hydrostatic bearing. FIG. 6A illustrates such an embodiment, with an upper bearing 602, a lower bearing 604, and a tail bearing 606. The upper bearing 602 uses a hydrostatic bearing whose sleeve is joined with two touchdown ball bearings as described above. The tail bearing 606 is a hydrostatic bearing. FIG. 6B illustrates the lower bearing 604 in detail. The lower bearing 604 uses a hydrostatic bearing 620, whose sleeve is joined to two touchdown ball bearings 622.

The thrust bearing 626 is located on top of the joined hydrostatic bearing 620 and the touchdown ball bearings 622.

Figure 7A:
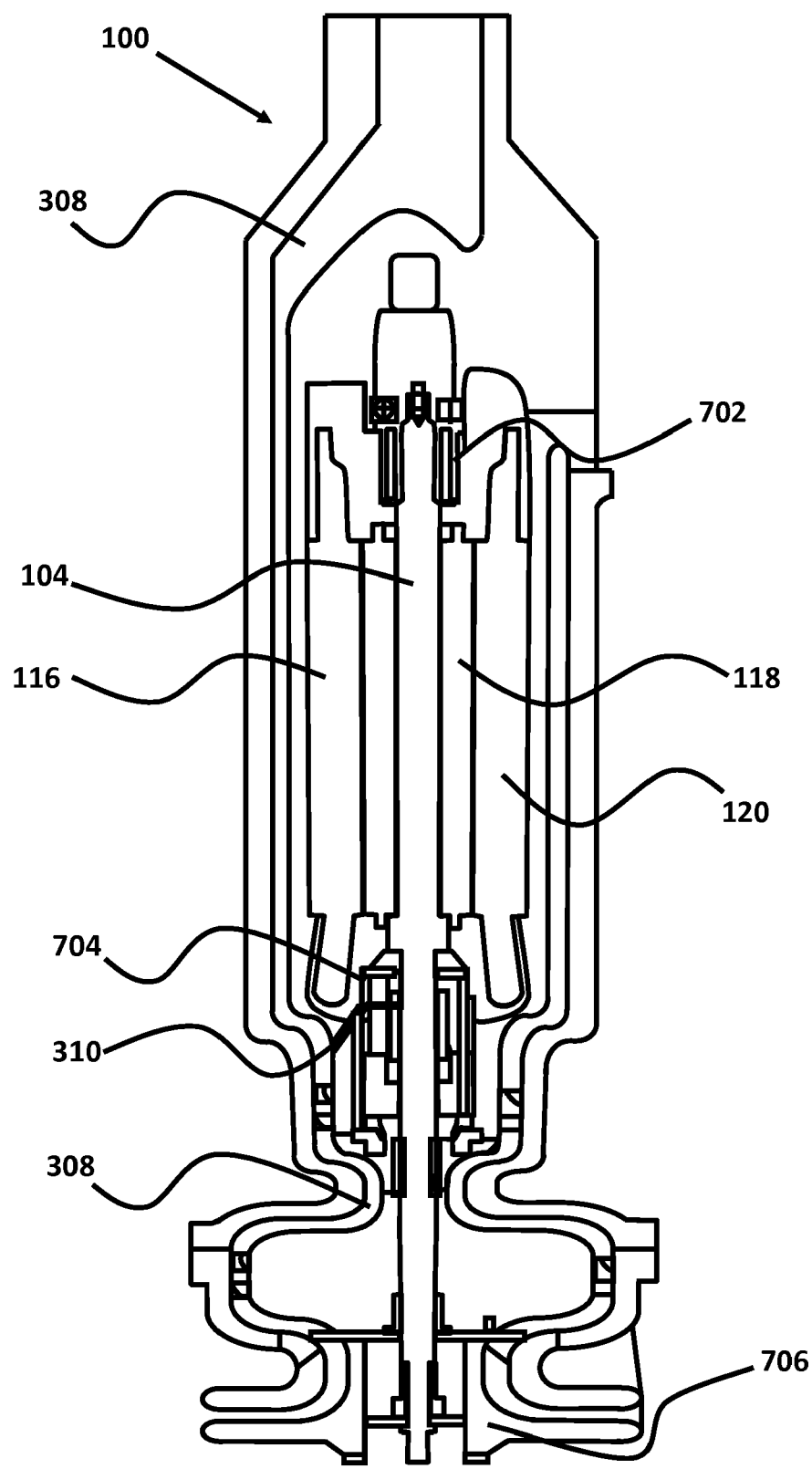
FIGS. 7A, 7B and 7C illustrate cross-sectional views of an expander using a combination of a hydrostatic bearing with a thrust bearing in accordance with an embodiment.
Figure 7B:
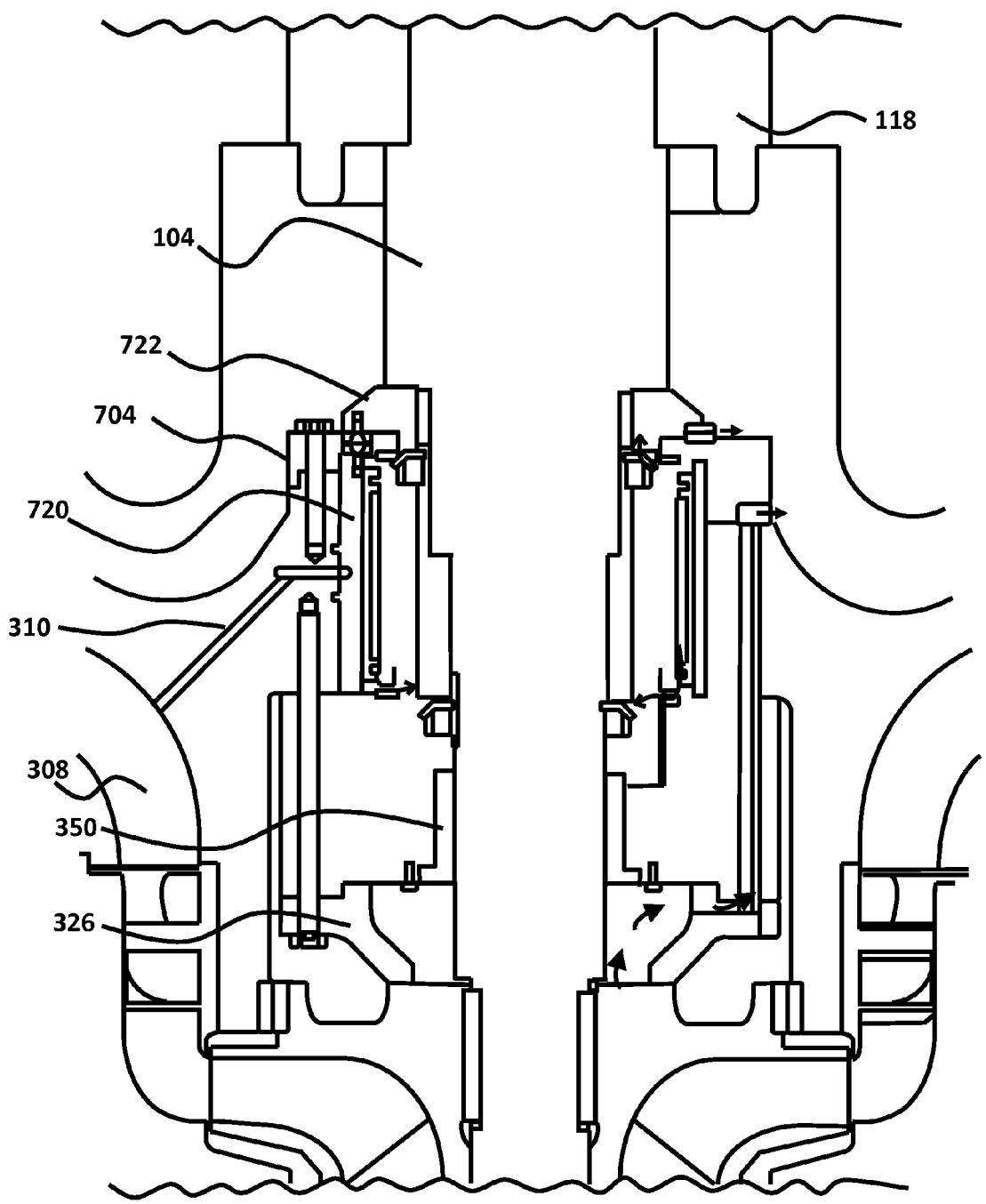
Figure 7C:
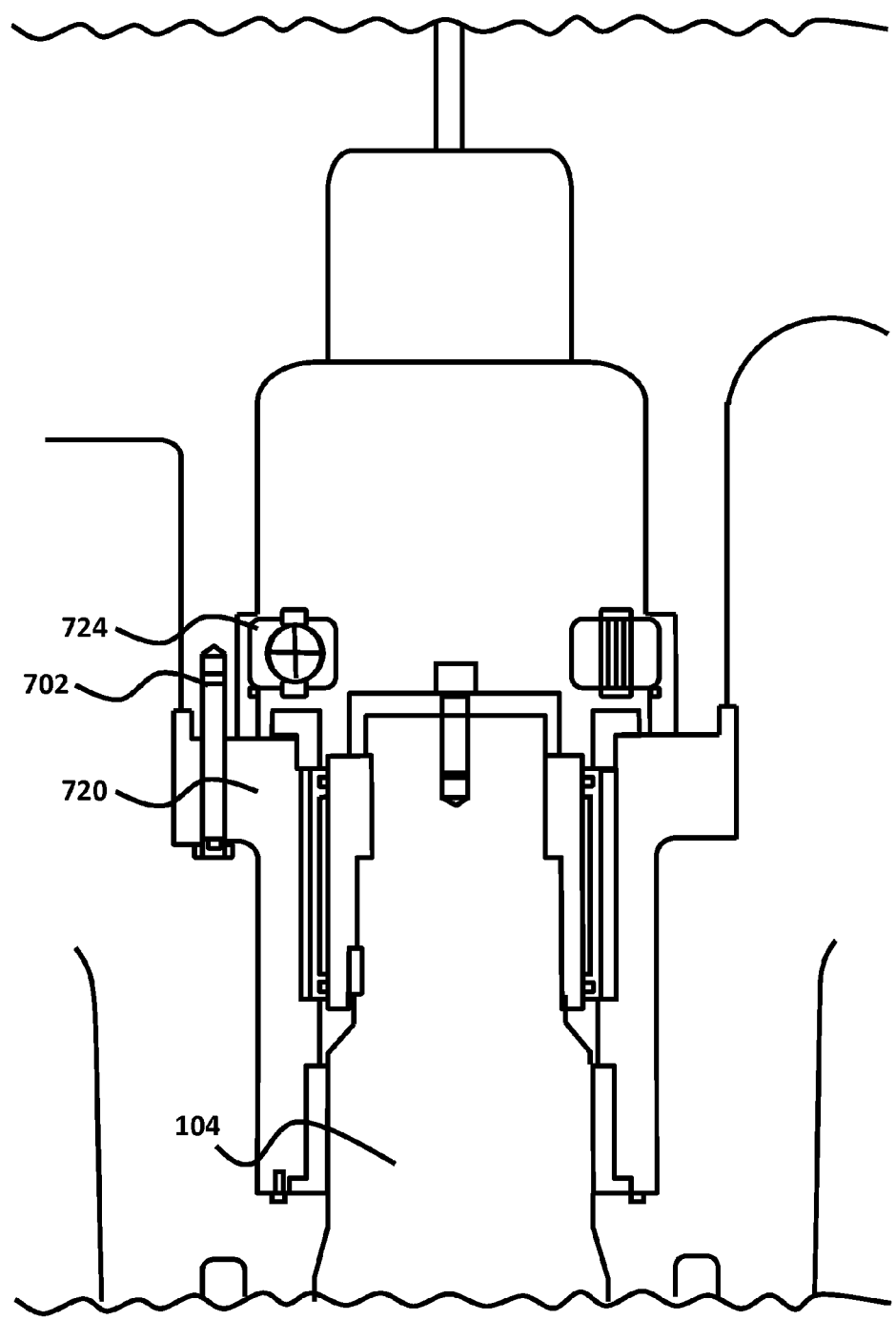

FIG. 7A illustrates yet another embodiment that eliminates the use of a touchdown ball bearing and uses the combination of a hydrostatic bearing and a thrust bearing to support the rotor of the expander. FIG. 7A shows upper bearing 702, lower bearing 704, and tail bearing 706. FIG. 7B illustrates the lower bearing 704 in detail. The lower bearing 704 includes a hydrostatic bearing 720 and a thrust bearing 722. The thrust bearing 722 performs the function of supporting the rotor 118 during transient conditions of start/stop periods. FIG. 7C illustrates the upper bearing 702 in detail. The upper bearing 702 uses the combination of a hydrostatic bearing 720 and a touchdown ball bearing 724. The use of the touchdown ball bearing 724 in the upper bearing 702 stabilizes the rotor 118 during transient conditions. Alternative embodiments may use a hydrostatic bearing 720 and a thrust bearing 722 in the upper bearing 702. Yet another embodiment may use in the upper bearing 702 the hydrostatic bearing 720, the thrust bearing 722, and the touchdown ball bearing 724. The tail bearing 706 uses a hydrostatic bearing.

Figure 8:
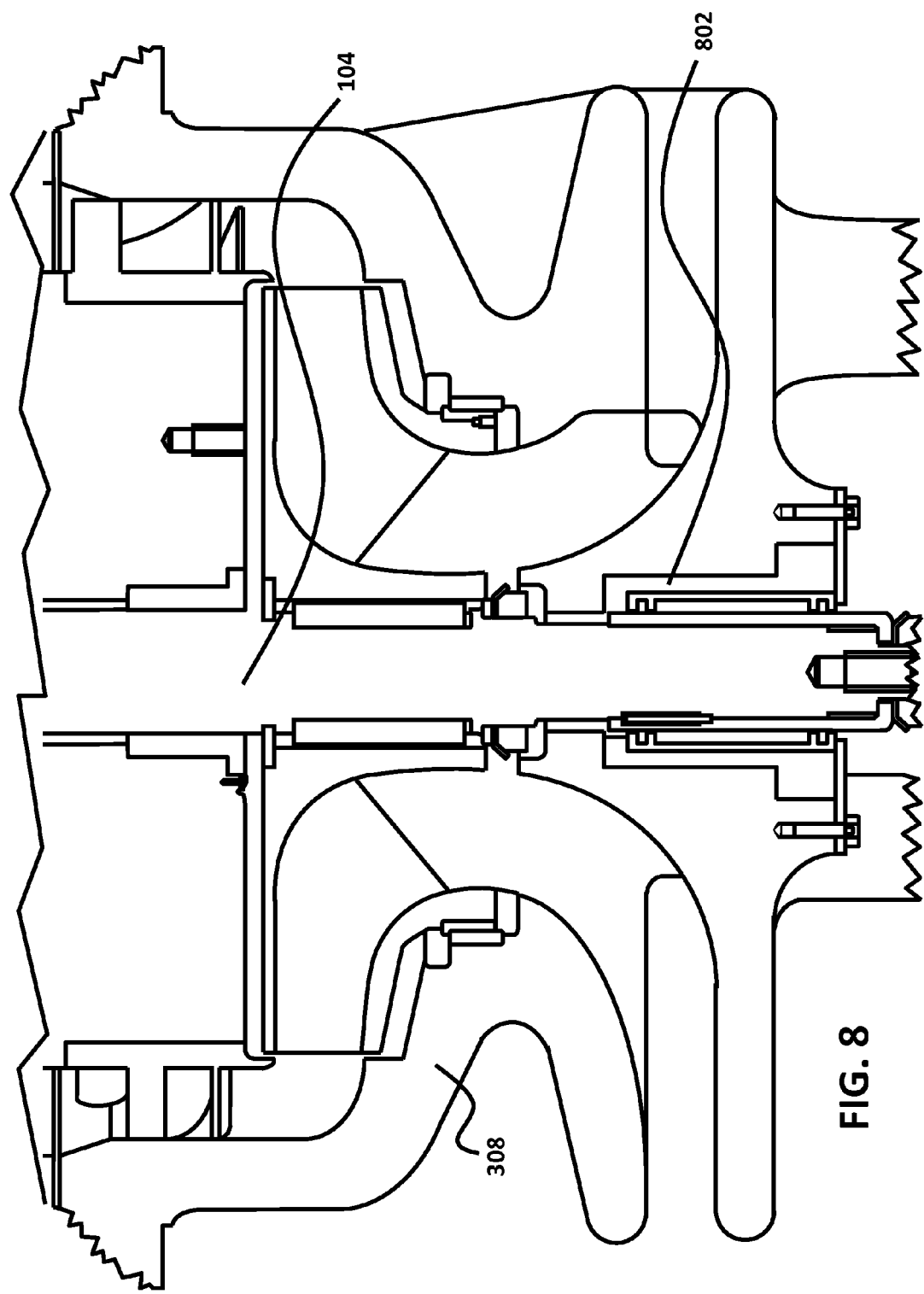
FIG. 8 illustrates a cross-sectional view of an expander using a tail bearing with a hydrostatic bearing in accordance with an embodiment.

FIG. 8 illustrates an embodiment of a tail bearing 802. Example bearings that can be used for the tail bearing 802 include a hydrostatic bearing or a pressurized journal bearing. The use of a hydrostatic bearing in the tail bearing further stabilizes the rotor by preventing torque-induced precession. Torque-induced precession is the phenomenon in which the axis of a spinning object wobbles when a torque is applied to it. Alternative embodiments may not include a tail bearing.

While a number of embodiments have been illustrated and described herein, along with several alternatives and combinations of various elements, for use in an inducer to a pump, impeller, or some other structure, it is to be understood that the embodiments described herein are not limited to inducers only used with pumps and impellers and can have a multitude of additional uses and applications. Accordingly, the embodiments should not be limited to just the particular descriptions, variations and drawing figures contained in this specification, which merely illustrate a preferred embodiment and several alternative embodiments.

What is claimed is:

1. A turbine generator equipped with one or more combinations of hydrostatic bearings, comprising:
   a turbine shaft;
   an electric motor rotor mounted on the turbine shaft and an electric motor stator positioned around the rotor;
   a thrust equalizing mechanism device supporting the turbine shaft when a rotation speed of the turbine shaft is greater than a rotation threshold;
   an upper bearing combination supporting the turbine shaft and positioned at an upper portion of the turbine shaft, the upper bearing combination including an upper hydrostatic bearing, an upper bushing, and an another upper bearing;
   an upper feed line extracting a fluid from a main circuit of the turbine generator and feeding a pressurized fluid to the upper hydrostatic bearing;
   a lower bearing combination supporting the turbine shaft and positioned at a middle portion of the turbine shaft, the lower bearing combination including a lower hydrostatic bearing, a lower bushing, and an another lower bearing, wherein the another lower bearing is a lower touchdown ball bearing positioned on top of the lower hydrostatic bearing, the lower touchdown ball bearing supporting the turbine shaft during standstill conditions and when the rotation speed is less than the rotation threshold, the lower hydrostatic bearing supporting the turbine shaft when the rotation speed is greater than the rotation threshold; and
   a lower feed line extracting the fluid from the main circuit and feeding the pressurized fluid to the lower hydrostatic bearing.

2. The turbine generator as recited in claim 1, wherein the another upper bearing is an upper touchdown ball bearing positioned on top of the upper hydrostatic bearing, further comprising an upper thrust bearing positioned on top of the upper touchdown ball bearing, the upper touchdown ball bearing supporting the turbine shaft during standstill conditions and when the rotation speed is less than the rotation threshold, the upper hydrostatic bearing supporting the turbine shaft when the rotation speed is greater than the rotation threshold, the upper thrust bearing protecting the electric motor rotor from damage in case the upper hydrostatic bearing and the upper touchdown ball bearing are damaged.

3. The turbine generator as recited in claim 1, further comprising a lower thrust bearing positioned on top of the lower touchdown ball bearing, the lower thrust bearing protecting the electric motor rotor from damage in case the lower hydrostatic bearing and the lower touchdown ball bearing are damaged.

4. The turbine generator as recited in claim 1, wherein the another upper bearing is an upper thrust bearing positioned on top of the upper hydrostatic bearing, the upper thrust bearing supporting the electric motor rotor during standstill conditions and when the rotation speed is less than the rotation threshold, the upper hydrostatic bearing supporting the turbine shaft when the rotation speed is greater than the rotation threshold.

5. A turbine generator equipped with one or more combinations of hydrostatic bearings, comprising:
   a turbine shaft;
   an electric motor rotor mounted on the turbine shaft and an electric motor stator positioned around the rotor;
   a thrust equalizing mechanism device supporting the turbine shaft when a rotation speed of the turbine shaft is greater than a rotation threshold;
   an upper bearing combination supporting the turbine shaft and positioned at an upper portion of the turbine shaft, the upper bearing combination including an upper hydrostatic bearing, an upper bushing, and an another upper bearing, wherein the another upper bearing includes one or more upper touchdown ball bearings positioned adjoining a sleeve of the upper hydrostatic bearing, the one or more upper touchdown ball bearings and the sleeve forming a joined piece fixed to the turbine shaft, the joined piece supporting the electric motor rotor and the turbine shaft during standstill conditions and when the rotation speed is less than the rotation threshold, the one or more upper touchdown ball bearings supporting the sleeve and the sleeve supporting the electric motor rotor when the rotation speed is greater than the rotation threshold;
   an upper feed line extracting a fluid from a main circuit of the turbine generator and feeding a pressurized fluid to the upper hydrostatic bearing;
   a lower bearing combination supporting the turbine shaft and positioned at a middle portion of the turbine shaft, the lower bearing combination including a lower hydrostatic bearing, a lower bushing, and an another lower bearing; and
   a lower feed line extracting the fluid from the main circuit and feeding the pressurized fluid to the lower hydrostatic bearing.

6. The turbine generator as recited in claim 5, further comprising an upper thrust bearing positioned on top of the joined piece, the upper thrust bearing protecting the electric motor rotor from damage in case the upper hydrostatic bearing and the one or more upper touchdown ball bearings are damaged.

7. A turbine generator equipped with one or more combinations of hydrostatic bearings, comprising:
   a turbine shaft;
   an electric motor rotor mounted on the turbine shaft and an electric motor stator positioned around the rotor;
   a thrust equalizing mechanism device supporting the turbine shaft when a rotation speed of the turbine shaft is greater than a rotation threshold;
   an upper bearing combination supporting the turbine shaft and positioned at an upper portion of the turbine shaft, the upper bearing combination including an upper hydrostatic bearing, an upper bushing, and an another upper bearing;
   an upper feed line extracting a fluid from a main circuit of the turbine generator and feeding a pressurized fluid to the upper hydrostatic bearing;
   a lower bearing combination supporting the turbine shaft and positioned at a middle portion of the turbine shaft, the lower bearing combination including a lower hydrostatic bearing, a lower bushing, and an another lower bearing, wherein the another lower bearing includes one or more lower touchdown ball bearings positioned adjoining a sleeve of the lower hydrostatic bearing, the one or more lower touchdown ball bearings and the sleeve forming a joined piece fixed to the turbine shaft, the joined piece supporting the electric motor rotor and the turbine shaft during standstill conditions and when the rotation speed is less than the rotation threshold, the one or more lower touchdown ball bearings supporting the sleeve and the sleeve supporting the electric motor rotor when the rotation speed is greater than the rotation threshold; and
   a lower feed line extracting the fluid from the main circuit and feeding the pressurized fluid to the lower hydrostatic bearing.

8. The turbine generator as recited in claim 7, further comprising a lower thrust bearing positioned on top of the joined piece, the lower thrust bearing protecting the electric motor rotor from damage in case the lower hydrostatic bearing and the one or more lower touchdown ball bearings are damaged.

9. The turbine generator as recited in claim 7, wherein the another upper bearing is an upper touchdown ball bearing positioned on top of the upper hydrostatic bearing, further comprising an upper thrust bearing positioned on top of the upper touchdown ball bearing, the upper touchdown ball bearing supporting the turbine shaft during standstill conditions and when the rotation speed is less than the rotation threshold, the upper hydrostatic bearing supporting the turbine shaft when the rotation speed is greater than the rotation threshold, the upper thrust bearing protecting the electric motor rotor from damage in case the upper hydrostatic bearing and the upper touchdown ball bearing are damaged.

10. The turbine generator as recited in claim 7, wherein the another upper bearing is an upper thrust bearing positioned on top of the upper hydrostatic bearing, the upper thrust bearing supporting the electric motor rotor during standstill conditions and when the rotation speed is less than the rotation threshold, the upper hydrostatic bearing supporting the turbine shaft when the rotation speed is greater than the rotation threshold.

11. A turbine generator equipped with one or more combinations of hydrostatic bearings, comprising:
    a turbine shaft;
    an electric motor rotor mounted on the turbine shaft and an electric motor stator positioned around the rotor;
    a thrust equalizing mechanism device supporting the turbine shaft when a rotation speed of the turbine shaft is greater than a rotation threshold;
    an upper bearing combination supporting the turbine shaft and positioned at an upper portion of the turbine shaft, the upper bearing combination including an upper hydrostatic bearing, an upper bushing, and an another upper bearing;
    an upper feed line extracting a fluid from a main circuit of the turbine generator and feeding a pressurized fluid to the upper hydrostatic bearing;
    a lower bearing combination supporting the turbine shaft and positioned at a middle portion of the turbine shaft, the lower bearing combination including a lower hydrostatic bearing, a lower bushing, and an another lower bearing, wherein the another lower bearing is a lower thrust bearing positioned on top of the lower hydrostatic bearing, the lower thrust bearing supporting the electric motor rotor during standstill conditions and when the rotation speed is less than the rotation threshold, the lower hydrostatic bearing supporting the turbine shaft when the rotation speed is greater than the rotation threshold; and
    a lower feed line extracting the fluid from the main circuit and feeding the pressurized fluid to the lower hydrostatic bearing.

12. The turbine generator as recited in claim 11, wherein the another upper bearing is an upper touchdown ball bearing positioned on top of the upper hydrostatic bearing, further comprising an upper thrust bearing positioned on top of the upper touchdown ball bearing, the upper touchdown ball bearing supporting the turbine shaft during standstill conditions and when the rotation speed is less than the rotation threshold, the upper hydrostatic bearing supporting the turbine shaft when the rotation speed is greater than the rotation threshold, the upper thrust bearing protecting the electric motor rotor from damage in case the upper hydrostatic bearing and the upper touchdown ball bearing are damaged.

13. The turbine generator as recited in claim 11, wherein the another upper bearing is an upper thrust bearing positioned on top of the upper hydrostatic bearing, the upper thrust bearing supporting the electric motor rotor during standstill conditions and when the rotation speed is less than the rotation threshold, the upper hydrostatic bearing supporting the turbine shaft when the rotation speed is greater than the rotation threshold.

\* \* \* \* \*